United States Patent
Hattori et al.

(10) Patent No.: US 9,059,460 B2
(45) Date of Patent: Jun. 16, 2015

(54) PRISMATIC SECONDARY BATTERY

(71) Applicant: SANYO Electric Co., Ltd., Moriguchi-shi, Osaka (JP)

(72) Inventors: Takayuki Hattori, Kasai (JP); Eiji Okutani, Kasai (JP); Yoshinori Yokoyama, Kasai (JP); Yasuhiro Yamauchi, Kasai (JP)

(73) Assignee: SANYO Electric Co., Ltd., Daito-shi (JP)

( * ) Notice: Subject to any disclaimer, the term of this patent is extended or adjusted under 35 U.S.C. 154(b) by 0 days.

(21) Appl. No.: 14/610,643

(22) Filed: Jan. 30, 2015

(65) Prior Publication Data

US 2015/0140370 A1    May 21, 2015

Related U.S. Application Data

(63) Continuation of application No. 13/551,258, filed on Jul. 17, 2012.

(51) Int. Cl.
| | |
|---|---|
| *H01M 2/36* | (2006.01) |
| *H01M 2/04* | (2006.01) |
| *H01M 2/12* | (2006.01) |
| *H01M 2/02* | (2006.01) |
| *H01M 10/04* | (2006.01) |

(52) U.S. Cl.
CPC .............. *H01M 2/362* (2013.01); *H01M 2/043* (2013.01); *H01M 2/12* (2013.01); *H01M 2/024* (2013.01); *H01M 10/0431* (2013.01); *H01M 2/0217* (2013.01); *H01M 2/0426* (2013.01); *H01M 2/361* (2013.01); *H01M 2200/20* (2013.01)

(58) Field of Classification Search
CPC .. Y02E 60/12; H01M 2/1241; H01M 2/1229; H01M 2/12; H01M 2/342; H01M 2/344; H01M 2/1205; H01M 10/52
See application file for complete search history.

(56) References Cited

U.S. PATENT DOCUMENTS

| | | | |
|---|---|---|---|
| 7,781,088 B2 | 8/2010 | Yamauchi et al. | |
| 8,153,289 B2 | 4/2012 | Uh et al. | |
| 8,273,473 B2 | 9/2012 | Jung | |
| 2006/0040181 A1 | 2/2006 | Kim et al. | |
| 2006/0261960 A1* | 11/2006 | Haraguchi et al. | 340/572.8 |

(Continued)

OTHER PUBLICATIONS

U.S. Non-Final Office Action dated Feb. 14, 2014 issued in U.S. Appl. No. 13/551,258.

(Continued)

*Primary Examiner* — Patrick Ryan
*Assistant Examiner* — Ben Lewis
(74) *Attorney, Agent, or Firm* — Westerman, Hattori, Daniels & Adrian, LLP

(57) ABSTRACT

A prismatic secondary battery 10 includes a prismatic hollow outer body having a mouth and a bottom and storing an electrode assembly, a positive electrode collector, a negative electrode collector, and an electrolyte, a sealing plate 20 sealing up the mouth of the prismatic hollow outer body, and a positive electrode terminal 15 and a negative electrode terminal 17 attached to the sealing plate 20; the sealing plate 20 includes a gas release valve 25 at the center between the positive electrode terminal 15 and the negative electrode terminal 17 and includes an electrolyte pour hole 23 on one side of the gas release valve 25 and, on the other side on the front face, a concaved flat face with a height lower than that of the peripheral portion; and the concaved flat face is formed with an identification code 33.

3 Claims, 3 Drawing Sheets

(56) References Cited

U.S. PATENT DOCUMENTS

| | | |
|---|---|---|
| 2008/0156880 A1 | 7/2008 | Vinogradov |
| 2010/0233529 A1* | 9/2010 | Nansaka et al. ............. 429/181 |
| 2010/0304214 A1 | 12/2010 | Itoh et al. |
| 2011/0183193 A1 | 7/2011 | Byun et al. |
| 2012/0114991 A1* | 5/2012 | Park et al. ..................... 429/82 |
| 2012/0196160 A1 | 8/2012 | Guen |

OTHER PUBLICATIONS

U.S. Non-Final Office Action dated Jun. 17, 2014 issued in U.S. Appl. No. 13/550,882.

U.S. Final Office Action dated Oct. 31, 2014 issued in U.S. Appl. No. 13/551,258.

U.S. Non-Final Office Action dated Nov. 12, 2014 issued in U.S. Appl. No. 13/550,882.

* cited by examiner

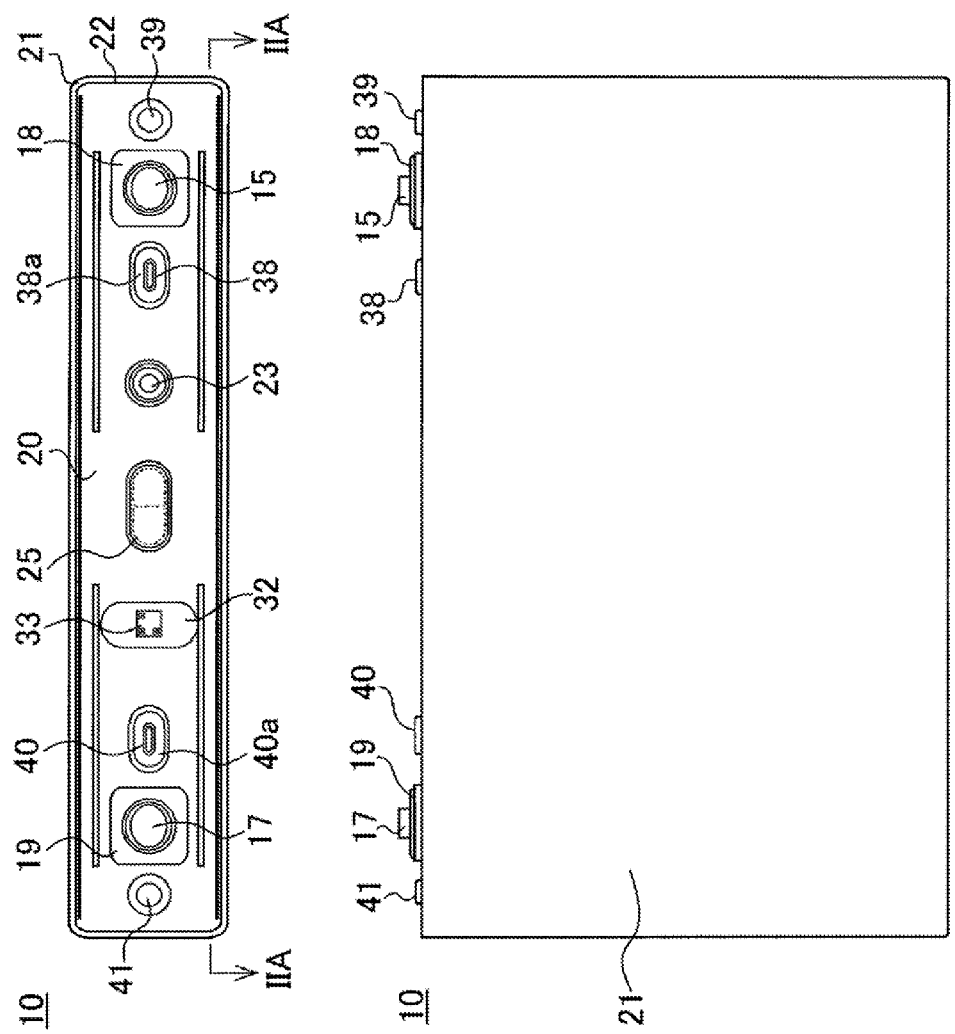

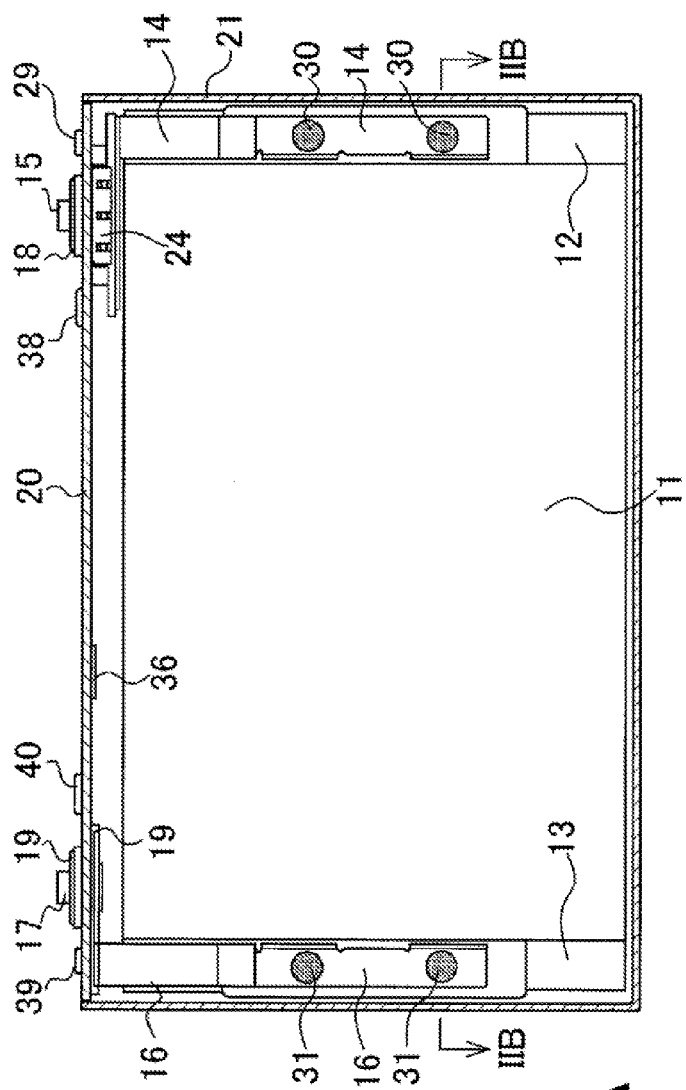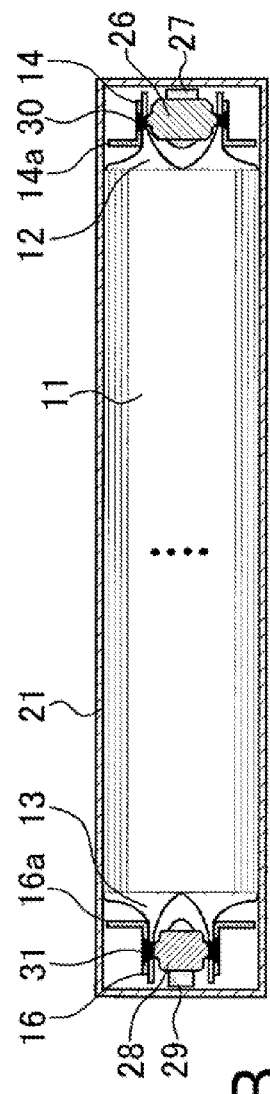
Fig.2A
Fig.2B

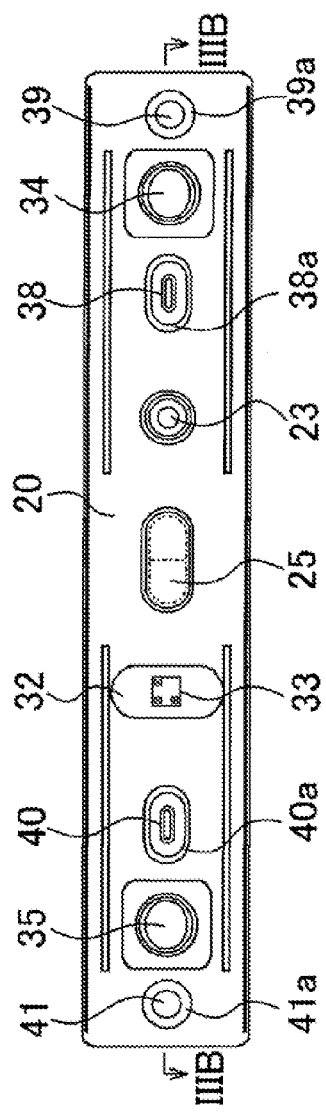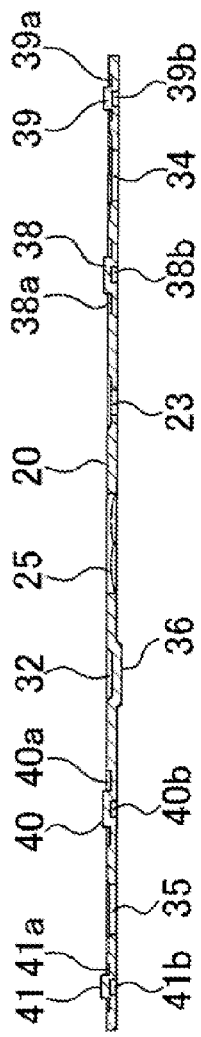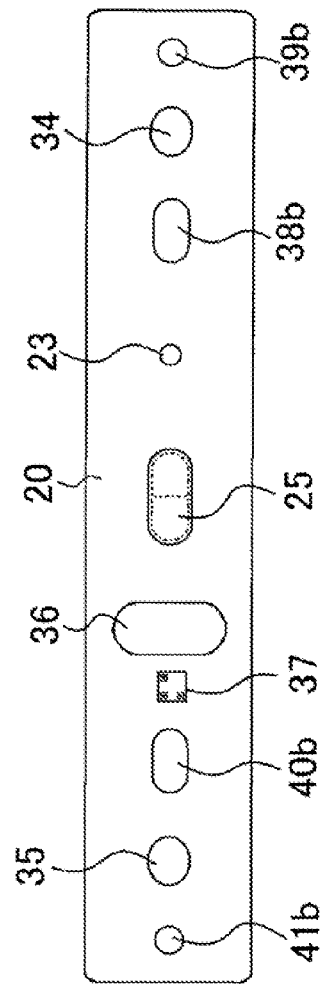

PRISMATIC SECONDARY BATTERY

CROSS-REFERENCE TO RELATED APPLICATIONS

The present patent application is a continuation of U.S. application Ser. No. 13/551,258, filed Jul. 17, 2012, which is incorporated herein by reference in its entirety.

TECHNICAL FIELD

The present invention relates to a prismatic secondary battery.

BACKGROUND ART

Alkaline secondary batteries typified by a nickel-hydrogen battery and nonaqueous electrolyte secondary batteries typified by a lithium ion battery are widely used as power supplies for driving portable electronic equipment such as cell phones including smartphones, portable computers, PDAs, and portable music players. In addition, alkaline secondary batteries and the nonaqueous electrolyte secondary batteries are also widely used for power supplies for driving electric vehicles (EVs) and hybrid electric vehicles (HEVs, PHEVs) and in stationary storage battery systems for suppressing the variation in output power of photovoltaic generation, wind power generation, and the like, and for peak shifts in system power in order to store electric power during the night time and to use the electric power during daytime.

In particular, the batteries for EVs, HEVs, and PHEVs and for the stationary storage battery system are required to have high capacity and high output characteristics, and hence each battery is upsized and a number of batteries are connected in series or parallel when used. To address this, in these applications, prismatic secondary batteries are generally used from the viewpoint of space efficiency. A prismatic secondary battery that further needs physical strength commonly employs, as an outer body of the battery, a metal prismatic outer body having a mouth and a metal sealing plate for sealing up the mouth.

Such a prismatic secondary battery, for example, a prismatic nonaqueous electrolyte secondary battery, is produced as follows. For example, both faces of a positive electrode substrate made from, for example, a long sheet of aluminum foil, are coated with a positive electrode active material mixture containing a positive electrode active material to prepare a positive electrode sheet. Separately, both faces of a negative electrode substrate made from, for example, a long sheet of copper foil, are coated with a negative electrode active material mixture containing a negative electrode active material to prepare a negative electrode sheet.

Next, the positive electrode sheet and the negative electrode sheet are stacked interposing a separator made from, for example, a microporous polyethylene film therebetween, and the positive electrode sheet and the negative electrode sheet are spirally wound on a cylindrical winding core while insulating the positive electrode sheet and the negative electrode sheet from each other through the separator to prepare a cylindrical wound electrode assembly. Then, the cylindrical wound electrode assembly is pressed with a pressing machine to form a flat wound electrode assembly. Next, a positive electrode collector electrically connected to the positive electrode sheet is electrically connected to a positive electrode terminal that is insulated from a sealing plate, while a negative electrode collector electrically connected to the negative electrode sheet is electrically connected to a negative electrode terminal that is insulated from a sealing plate. Then, the flat wound electrode assembly is wrapped with a member having insulating characteristics and stored in a metal prismatic outer body; a mouth portion of the prismatic outer body is sealed with a sealing plate; an electrolyte is poured from a electrolyte pour hole provided on the sealing plate; and finally the electrolyte pour hole is sealed to produce the prismatic nonaqueous electrolyte secondary battery.

Such a prismatic secondary battery required to have high capacity and high output characteristics is required to have much higher safety than that of secondary batteries for portable small equipment. Especially, in the case of a nonaqueous electrolyte secondary battery that uses a material having very high reactivity, for example, as shown in US Patent Publication No. 2010/0233529 (U52010/0233529 (A1)) and U.S. Pat. No. 7,781,088 specification (U.S. Pat. No. 7,781,088 (B2)), this nonaqueous electrolyte secondary battery is equipped with a gas release valve for releasing internal pressure when the pressure in a battery outer body is increased and a current interruption mechanism for interrupting electrical connection between an external terminal and an electrode assembly in the outer body.

The metal sealing plate used for the prismatic secondary battery includes at least a mouth for attaching a positive electrode terminal, a mouth for attaching a negative electrode terminal, a gas release valve, and an electrolyte pour hole. The metal sealing plate commonly has a rectangular shape, a chamfered rectangular shape, a rounded rectangular shape, or an oval shape. The mouth for attaching a positive electrode terminal and the mouth for attaching a negative electrode terminal are arranged on both end sides in a longitudinal direction of the sealing plate, and each of the gas release valve and the electrolyte pour hole is provided between the negative electrode terminal and the positive electrode terminal on the sealing plate.

Meanwhile, the prismatic secondary battery is mass-produced and thus is preferred to have a sealing plate with any identification code for providing traceability during an assembly process and after the assembly. Such an identification code can be easily formed by printing, laser marking, or seal-affixing on the sealing plate. However, when an electrolyte is poured from the electrolyte pour hole into the prismatic outer body, there is a possibility that the electrolyte disperses and adheres to the identification code formed on the sealing plate. Adherence of the electrolyte to the identification code deteriorates readability of the identification code. There is also a possibility that the traceability is lost due to corrosion or damage of the identification code by electrolyte adhered to the identification code or by acid generated by a reaction of electrolyte and moisture in the air.

SUMMARY

An advantage of some aspects of the invention is to provide a prismatic secondary battery in which a dispersed electrolyte is unlikely to adhere to an identification code formed on the sealing plate when the electrolyte is poured from an electrolyte pour hole into a prismatic hollow outer body.

According to an aspect of the invention, a prismatic secondary battery comprises: a prismatic hollow outer body having a mouth and a bottom; an electrode assembly including a positive electrode sheet and a negative electrode sheet, a positive electrode collector electrically connected to the positive electrode sheet, a negative electrode collector electrically connected to the negative electrode sheet, and an electrolyte, all being stored in the prismatic hollow outer body; a sealing plate sealing up the mouth of the prismatic hollow outer body;

and a positive electrode terminal and a negative electrode terminal attached to the sealing plate in a manner electrically insulated from the sealing plate, while electrically connected to the positive electrode collector and the negative electrode collector, respectively, on the sealing plate, wherein the positive electrode terminal is fixed on one end side in a longitudinal direction of the sealing plate and the negative electrode terminal is fixed on the other end side, the gas release valve and an electrolyte pour hole are formed in the sealing plate between the positive electrode terminal and the negative electrode terminal, the sealing plate includes a front face having an identification code formed on a side opposite to a side having the electrolyte pour hole with respect to the gas release valve in a longitudinal direction of the sealing plate.

In the prismatic secondary battery of the invention, the identification code is formed on the side opposite to the electrolyte pour hole with respect to the gas release valve, and this increases the distance between the electrolyte pour hole and the identification code. As a result, with the prismatic secondary battery of the invention, even when an electrolyte is dispersed at the time when the electrolyte is poured from the electrolyte pour hole into the prismatic hollow outer body, the electrolyte is unlikely to adhere to the identification code, and hence the readability of the identification code is unlikely to deteriorate.

The sealing plate usable in the invention may have, for example, a rectangular shape, a chamfered rectangular shape, a rounded rectangular shape, or an oval shape in a planar view.

The "front face" of the prismatic secondary battery of the invention represents a portion positioned on the outer side of the prismatic secondary battery, while a portion of the sealing plate positioned on the inner side of the prismatic secondary battery is expressed as a "back face". In the prismatic secondary battery of the invention, an applying mode of the identification code may be any known mode, for example, printing, laser marking, and seal-affixing. Among them, laser marking is preferably adopted because the identification code applied is unlikely to be abraded or peeled, and is unlikely to be misread. Examples of the usable types of identification codes include a well-known code including a simple code such as numbers, characters, and symbols, a one-dimensional code such as a bar-code, and a two-dimensional code such as a stacked bar-code. Among them, the two-dimensional code is desirable because it can contain a large amount of information and is misread less frequently even when the code has been abraded or peeled away.

In the prismatic secondary battery of the invention, the gas exhausted valve may be integrally formed with the sealing plate. Alternatively, the gas exhausted valve may be formed by connecting a valve that is separately manufactured from the sealing plate to an opening formed on the sealing plate. In the latter case, the valve may be placed so as to cover the opening formed on the sealing plate, and the peripheral portion of the valve is connected to the sealing plate by laser welding etc.

In the prismatic secondary battery according to the aspect of the invention, the front face of the sealing plate may preferably be provided with a concaved flat face formed on the side opposite to the side having the electrolyte pour hole with respect to the gas release valve in the longitudinal direction of the sealing plate, the concaved flat face has a height less than that of the peripheral portions around the concaved flat face, and the identification code is formed on the concaved flat face.

The concaved flat face is formed on the front face of the sealing plate and has the flat face having a height less than that of the peripheral portions around the sealing plate and includes the identification code formed on the concaved flat face. Hence, even when a jig for assembling the prismatic secondary battery or the like comes into contact with the sealing plate, such a jig is unlikely to come into contact with the identification code part. On this account, with the sealing plate for a prismatic secondary battery of the invention, the identification code is unlikely to be abraded, and therefore the traceability is unlikely to be lost during an assembly process and after the assembly of the prismatic secondary battery. The "concaved flat face" in the sealing plate for a prismatic secondary battery of the invention may include a so-called "groove" including a flat face that has a height less than that of the peripheral portions and that is formed across the whole width (short side direction) of the sealing plate, however, preferably includes a flat face has a height less than that of the peripheral portions thereof which is formed in one part of the width direction (short side direction) of the sealing plate. If the concaved flat face that has a height less than that of the peripheral portions is formed in one part of the width direction of the sealing plate, the reduction in flexural strength with respect to the longitudinal direction of the sealing plate is small in the concaved portion. This can suppress the deformation of the sealing plate when the internal pressure of the prismatic secondary battery is increased and can stabilize working pressure of the gas release valve. Moreover, the sealing plate does not generate a level difference in the fitting portion between the sealing plate and the battery outer body, and this enables uniform laser-welding of the fitting portion between the sealing plate and the battery outer body.

In the prismatic secondary battery according to the aspect of the invention, the sealing plate may preferably include a back face having a convex portion at a position corresponding to the concaved flat face.

The presence of the concaved portion on the front face and the convex portion on the back face of the sealing plate increases the flexural strength of the sealing plate in both the longitudinal direction and the width direction. Hence, such a structure can further suppress the deformation of the sealing plate when the internal pressure of the prismatic secondary battery is increased and can further stabilize working pressure of the gas release valve.

In the prismatic secondary battery according to the aspect of the invention, the gas release valve may preferably be formed at the center between the positive electrode terminal and the negative electrode terminal.

By forming the gas release valve at the center between the positive electrode terminal and the negative electrode terminal, the internal pressure of the battery is evenly applied to the gas release valve, and this stabilizes working pressure of the gas release valve.

In the prismatic secondary battery according to the aspect of the invention, an additional identification code may be applied on at least one side adjacent to the convex portion in the longitudinal direction of the sealing plate.

In the longitudinal direction of the sealing plate, both sides adjacent to the convex portion are positions at which a jig for assembling the prismatic secondary battery or the like is unlikely to physically come into contact. The back face of the sealing plate is positioned inside of the prismatic secondary battery and is not exposed to the outside after the completion of the prismatic secondary battery. Thus, with the sealing plate for a prismatic secondary battery of the invention, the additional identification code is unlikely to be abraded and hence the traceability is unlikely to be lost, at least during the assembly process of the prismatic secondary battery.

The additional identification code may be the same as or different from the identification code applied onto the concaved flat face. However, the additional identification code is not exposed to the outside after the completion of the prismatic secondary battery and is entirely used to ensure the traceability during an assembly process. Thus, the additional identification code is preferably different from the identification code applied onto the concaved flat face.

In the prismatic secondary battery according to the aspect, it is desirable that the convex portion be provided at a position adjacent to the gas release valve and that the additional identification code be formed at a position opposite to the gas release valve with respect to the convex portion.

The presence of the convex portion at a position adjacent to the gas release valve further increases the flexural strength of the sealing plate in both the longitudinal direction and the width direction. Hence, such a structure can further suppress the deformation of the sealing plate when the internal pressure of the prismatic secondary battery is increased and can further stabilize working pressure of the gas release valve.

In the prismatic secondary battery according to the aspect of the invention, the electrolyte pour hole may preferably be sealed by a sealing plug, the sealing plug is fitted to the electrolyte pour hole so as to pass through the electrolyte pour hole and to protrude beyond both the front face and the back face of the sealing plate. Hence, such a structure can further suppress the deformation of the sealing plate when the internal pressure of the prismatic secondary battery is increased and can further stabilize working pressure of the gas release valve. The sealing plug may preferably be a blind rivet.

In the prismatic secondary battery of the invention, it is optional whether the concaved flat face is on the positive electrode terminal side or on the negative electrode terminal side.

According to an aspect of the invention, a prismatic secondary battery comprises: a prismatic hollow outer body having a mouth and a bottom; an electrode assembly including a positive electrode sheet and a negative electrode sheet, a positive electrode collector electrically connected to the positive electrode sheet, a negative electrode collector electrically connected to the negative electrode sheet, and an electrolyte, all being stored in the prismatic hollow outer body; and a sealing plate sealing up the mouth of the prismatic hollow outer body, the gas release valve and an electrolyte pour hole being formed in the sealing plate, the sealing plate including a front face having an identification code formed on a side opposite to a side having the electrolyte pour hole with respect to the gas release valve in a longitudinal direction of the sealing plate.

In the prismatic secondary battery according to the invention, the front face of the sealing plate may preferably be provided with a concaved flat face formed on the side opposite to the side having the electrolyte pour hole with respect to the gas release valve in the longitudinal direction of the sealing plate, the concaved flat face has a height less than that of the peripheral portions of the concaved flat face, and the identification code is formed on the concaved flat face.

In the prismatic secondary battery according to the invention, the sealing plate may preferably include a back face having a convex portion at a position corresponding to the concaved flat face.

In the prismatic secondary battery according to the invention, an additional identification code may preferably be applied on at least one side adjacent to the convex portion in the longitudinal direction of the sealing plate.

In the prismatic secondary battery according to the invention, the additional identification code may preferably be formed at a position opposite to the gas release valve with respect to the convex portion.

In the prismatic secondary battery according to the invention, the electrolyte pour hole may preferably be sealed by a sealing plug, the sealing plug is fitted to the electrolyte pour hole so as to pass through the electrolyte pour hole and to protrude beyond both the front face and the back face of the sealing plate.

In the prismatic secondary battery according to the invention, the sealing plug may preferably be a blind rivet.

BRIEF DESCRIPTION OF THE DRAWINGS

The invention will be described with reference to the accompanying drawings, wherein like numbers reference like elements.

FIG. 1A is a front view of a prismatic nonaqueous electrolyte secondary battery of an embodiment and FIG. 1B is a plan view of the prismatic nonaqueous electrolyte secondary battery.

FIG. 2A is a partial cross-sectional view taken along the line IIA-IIA in FIG. 1B and FIG. 2B is a partial cross-sectional view taken along the line IIB-IIB in FIG. 2A.

FIG. 3A is a plan view of a sealing plate of the embodiment, FIG. 3B is a cross-sectional view taken along the line IIIB-IIIB in FIG. 3A, and FIG. 3C is a bottom view of the sealing plate of the embodiment.

DESCRIPTION OF EXEMPLARY EMBODIMENT

Hereinafter, embodiment of the invention will be described in detail with reference to the accompanying drawings. However, the embodiment described below is intended to exemplify the technical spirit of the invention, the invention is not intended to be limited to the embodiment, and the invention may equally be applied to various modified cases without departing from the technical spirit described in the claims.

EMBODIMENT

Firstly, as an example of a prismatic secondary battery of the embodiment, a prismatic nonaqueous electrolyte secondary battery will be described with reference to FIG. 1 and FIG. 2. FIG. 1A is a front view of the prismatic nonaqueous electrolyte secondary battery, and FIG. 1B is a plan view of the prismatic nonaqueous electrolyte secondary battery. FIG. 2A is a cross-sectional view taken along the line IIA-IIA in FIG. 1B, and FIG. 2B is a cross-sectional view taken along the line IIB-IIB in FIG. 2A.

A prismatic nonaqueous electrolyte secondary battery 10 includes a flat wound electrode assembly 11 in which a positive electrode sheet and a negative electrode sheet are wound while being insulated from each other through a separator, which are not shown in the drawings. The positive electrode sheet is prepared by coating both faces of a positive electrode substrate made from aluminum foil with a positive electrode active material mixture, then drying and rolling the coated substrate, and slitting the substrate so as to expose the aluminum foil in a strip shape. Separately, the negative electrode sheet is prepared by coating both faces of a negative electrode substrate made from copper foil with a negative electrode active material mixture, then drying and rolling the coated substrate, and slitting the substrate so as to expose the copper foil in a strip shape.

Then, the flat wound electrode assembly 11 is prepared as follows. The positive electrode sheet and the negative electrode sheet obtained as above are stacked interposing a polyolefin microporous separator therebetween so as to displace the aluminum foil exposed portion of the positive electrode sheet and the copper foil exposed portion of the negative electrode sheet from the corresponding counter electrode active material mixtures, and the whole is wound while insulating the positive electrode sheet and the negative electrode sheet from each other through the separator to afford the flat wound electrode assembly 11 including one end with a plurality of stacked positive electrode substrate exposed portions 12 and the other end with a plurality of stacked negative electrode substrate exposed portions 13.

The plurality of stacked positive electrode substrate exposed portions 12 are electrically connected through a positive electrode collector 14 made of aluminum to a positive electrode terminal 15 also made of aluminum, and similarly, the plurality of stacked negative electrode substrate exposed portions 13 are electrically connected through a negative electrode collector 16 made of copper to a negative electrode terminal 17 also made of copper. The positive electrode terminal 15 and the negative electrode terminal 17 are, as shown in FIG. 2A and FIG. 2B, fixed to a sealing plate 20 made of, for example, aluminum through an insulating members 18 and 19, respectively. The positive electrode terminal 15 and the negative electrode terminal 17 are, as necessary, connected to an external positive electrode terminal and an external negative electrode terminal (not shown in the drawings) arranged on the insulating members 18 and 19, respectively.

The flat wound electrode assembly 11 prepared as above is wrapped with a resin sheet (not shown in the drawings) having insulating characteristics except the sealing plate 20 side and is inserted into a prismatic hollow outer body 21 made of, for example, aluminum having an open face. Then, the sealing plate 20 is fitted to the mouth portion of the prismatic hollow outer body 21; a fitting portion 22 between the sealing plate 20 and the prismatic hollow outer body 21 is laser-welded; then, a nonaqueous electrolyte is poured from an electrolyte pour hole 23; and the electrolyte pour hole 23 is sealed up to produce the prismatic nonaqueous electrolyte secondary battery 10 of the embodiment.

A current interruption mechanism 24 that works correspondingly to the pressure of gas generated in the battery is provided between the positive electrode collector 14 and the positive electrode terminal 15. The sealing plate 20 also equips, at the center between the negative electrode terminal 17 and the positive electrode terminal 15, a gas release valve 25 that opens when the gas pressure becomes higher than the working pressure of the current interruption mechanism 24. Thus, the inside of the prismatic nonaqueous electrolyte secondary battery 10 is hermetically sealed. The current interruption mechanism 24 is not necessary to be provided. In the present invention, instead of being provided with the current interruption mechanism 24, the gas release valve 25 can open when the pressure inside the battery becomes higher than a predetermined value. The prismatic nonaqueous electrolyte secondary battery 10 is used alone or used with a plurality of the batteries connected in series or parallel, for various applications. When a plurality of the prismatic nonaqueous electrolyte secondary batteries 10 are connected in series or parallel to be used, an external positive electrode terminal and an external negative electrode terminal are preferably provided separately for connecting each battery through bus bars so as to send a large current.

In the flat wound electrode assembly 11, as shown in FIG. 2A and FIG. 2B, on the positive electrode sheet side, the plurality of stacked positive electrode substrate exposed portions 12 are divided into two portions, and between the portions, a positive electrode intermediate member 27 made of resin and having a plurality of positive electrode connection conductive members 26, two positive electrode connection conductive members 26 in the embodiment, is interposed. In a similar manner, on the negative electrode sheet side, the plurality of stacked negative electrode substrate exposed portions 13 are divided into two portions, and between the portions, a negative electrode intermediate member 29 made of resin and having two negative electrode connection conductive members 28 is interposed. On the outermost surface of the positive electrode substrate exposed portions 12 positioned on each side of the positive electrode connection conductive member 26, a positive electrode collector 14 is disposed, and on the outermost surface of the negative electrode substrate exposed portions 13 positioned on each side of the negative electrode connection conductive member 28, a negative electrode collector 16 is disposed. The positive electrode connection conductive member 26 is made of aluminum that is the same material as the positive electrode substrate, the negative electrode connection conductive member 28 is made of copper that is the same material as the negative electrode substrate, and the shape of the positive electrode connection conductive member 26 may be the same as or different from that of the negative electrode connection conductive member 28.

The positive electrode collector 14 is resistance-welded to the positive electrode substrate exposed portion 12 (at four points), and the positive electrode substrate exposed portion 12 is resistance-welded to the positive electrode connection conductive member 26 (at four points), for connection. Similarly, the negative electrode collector 16 is resistance-welded to the negative electrode substrate exposed portion 13 (at four points), and the negative electrode substrate exposed portion 13 is resistance-welded to the negative electrode connection conductive member 28 (at four points), for connection. FIG. 2A shows, on the positive electrode side, two weld marks 30 formed by the resistance welding and, on the negative electrode side, two weld marks 31.

Hereinafter, in the flat wound electrode assembly 11 of the Embodiment, the resistance welding method using the positive electrode substrate exposed portions 12, the positive electrode collector 14, and the positive electrode intermediate member 27 having the positive electrode connection conductive members 26 and the resistance welding method using the negative electrode substrate exposed portions 13, the negative electrode collector 16, and the negative electrode intermediate member 29 having the negative electrode connection conductive members 28 will be described in detail. However, in the Embodiment, the shapes of the positive electrode connection conductive member 26 and the positive electrode intermediate member 27 may be substantially the same as the shapes of the negative electrode connection conductive member 28 and the negative electrode intermediate member 29, and each resistance welding method may be substantially the same. Therefore, the method for the positive electrode sheet side will be described below as a typical example.

First, the positive electrode substrate exposed portions 12 of the flat wound electrode assembly 11 prepared as above were divided from the wound center to both side into two portions, and the divided positive electrode substrate exposed portions 12 were gathered to a center as a quarter of the thickness of the electrode assembly. Then, the positive electrode collectors 14 were disposed on both sides of the outermost periphery of the positive electrode substrate exposed portions 12, the positive electrode intermediate member 27 having the positive electrode connection conductive members 26 was inserted between both sides of the bisectional positive electrode substrate exposed portions 12 so that protrusions on both sides of the positive electrode connection conductive member 26 were in contact with the positive electrode substrate exposed portions 12 on the inner periphery thereof. The positive electrode collector 14 is made from, for example, an aluminum plate having a thickness of 0.8 mm.

Here, the positive electrode connection conductive member 26 held with the positive electrode intermediate member 27 in the Embodiment has a column-shaped body with two opposed faces, and a protrusion (projection) having, for example, a truncated cone shape is formed on each face. The positive electrode connection conductive member 26 may have any shape, for example, a prismatic shape and an elliptical column shape, in addition to the cylindrical shape, as long as it is a metal block. Examples of the material usable for forming the positive electrode connection conductive member 26 include copper, a copper alloy, aluminum, an aluminum alloy, tungsten, and molybdenum. In addition to the members made of these metals, for example, a member having a protrusion coated with nickel or a member in which the material of a protrusion and the vicinity of a bottom of the protrusion are changed into a metal capable of accelerating heat generation, such as tungsten and molybdenum and such a protrusion is bonded to the cylindrical-shaped body of the positive electrode connection conductive member 26 made of copper, a copper alloy, aluminum, or an aluminum alloy by brazing or the like may be used.

A plurality of the positive electrode connection conductive members 26 of the Embodiment, for example, two positive electrode connection conductive members are integrally held with the positive electrode intermediate member 27 made of a resin material. In this case, the positive electrode connection conductive members 26 are held so as to be parallel to each other. The positive electrode intermediate member 27 may have any shape, for example, a prismatic shape and a column shape. However, the shape is preferably a prismatic shape having a long lateral length in order to be fixed between the bisectional positive electrode substrate exposed portions 12 while being stably positioned. However, corners of the positive electrode intermediate member 27 are preferably chamfered so as not to scratch or deform the soft positive electrode substrate exposed portion 12 even when the corner comes into contact with the positive electrode substrate exposed portion 12. At least a part to be inserted between the bisectional positive electrode substrate exposed portions 12 may be chamfered.

The length of the prismatic positive electrode intermediate member 27 varies depending on the size of the prismatic nonaqueous electrolyte secondary battery 10, but may be 20 mm to several tens of mm. The width of the prismatic positive electrode intermediate member 27 may be substantially the same as the height of the positive electrode connection conductive member 26, but the prismatic positive electrode intermediate member 27 may have a width of which at least both ends of the positive electrode connection conductive member 26 to be welded are exposed. Both ends of the positive electrode connection conductive member 26 preferably protrude from the surface of the positive electrode intermediate member 27, but may not necessarily protrude. With such a structure, the positive electrode connection conductive member 26 is held with the positive electrode intermediate member 27 and the positive electrode intermediate member 27 is disposed between the bisectional positive electrode substrate exposed portions 12 while being stably positioned.

Next, between a pair of resistance welding electrode rods (not shown in the drawings), the positive electrode collector 14 and the flat wound electrode assembly 11 with the positive electrode intermediate member 27 holding the positive electrode connection conductive members 26 are disposed. The pair of the resistance welding electrode rods are brought into contact with the positive electrode collectors 14 disposed on both outermost periphery sides of the positive electrode substrate exposed portions 12. Then, an appropriate pressure is applied between the pair of the resistance welding electrode rods to perform resistance welding in a previously determined constant condition. During the resistance welding, the positive electrode intermediate member 27 is disposed while being stably positioned between the bisectional positive electrode substrate exposed portions 14. This improves the dimensional precision between the positive electrode connection conductive member 26 and the pair of electrode rods, enables the resistance welding in an exact and stable condition, and can suppress variation in the welding strength.

Next, the specific structure of the sealing plate of the invention will be described with reference to FIG. 3. FIG. 3A is a plan view of a sealing plate of the embodiment, FIG. 3B is a cross-sectional view taken along the line IIIB-IIIB in FIG. 3A, and FIG. 3C is a bottom view of the sealing plate of the embodiment.

The sealing plate 20 has, for example, a rectangular shape, includes a mouth 34 for attaching the positive electrode terminal 15 and a mouth 35 for attaching the negative electrode terminal 17 on each end side, and includes an electrolyte pour hole 23, a gas release valve 25, and a concave portion 32 between the mouths 34 and 35. The concave portion 32 has a flat face having a height less than that of the other portions in the sealing plate 20 and being partially formed in a width direction (short side direction) of the sealing plate 20. When the concave portion 32 is formed across the whole width of the sealing plate 20, it becomes a so-called "groove." Such a groove largely reduces the flexural strength of the sealing plate 20 in the longitudinal direction as well as generating a level difference between the sealing plate 20 and the end face of the prismatic hollow outer body 21 thereby to interfere with uniform laser-welding. In addition, on the sealing plate 20 of the embodiment, the gas release valve 25 is provided at the center between the mouth 34 for attaching the positive electrode terminal 15 and the mouth 35 for attaching the negative electrode terminal 17, the electrolyte pour hole 23 is provided on one side of the gas release valve 25, and the concave portion 32 is provided on the other side.

When a plurality of the prismatic nonaqueous electrolyte secondary batteries are connected in series or parallel, the external positive electrode terminal and the external negative electrode terminal (not shown in the drawings) are respectively attached to the positive electrode terminal 15 and the negative electrode terminal 17. First insulating member is placed between the external positive electrode terminal and the sealing plate 20 and a second insulating member is placed between the external negative electrode terminal and the sealing plate 20. The external positive electrode terminal and the first insulating member and the external negative electrode terminal and the second insulating member are respectively fixed. The sealing plate 20 of the embodiment further includes anti-rotation protrusions 38 and 40 and auxiliary protrusions 39 and 41 on both sides of the mouth 34 for the positive electrode and the mouth 35. The anti-rotation protrusions 38 and 40 and the auxiliary protrusions 39 and 41 are fitted to the first insulating member fixed to the external positive electrode terminal and fitted to second insulating member fixed to the external negative electrode terminal so that the external positive electrode terminal and the external negative electrode terminal are unlikely to rotate.

For the sealing plate 20 of the embodiment, a rectangular aluminum plate is punched out to form the mouths 34 and 35 and the electrolyte pour hole 23 by forging, and the gas release valve 25, the concaved flat face 32, the anti-rotation protrusions 38 and 40, and the auxiliary protrusions 39 and 41 are simultaneously formed. In the sealing plate 20, concaves 38a, 40a, 39a, and 41a are formed on the front face around the anti-rotation protrusions 38 and 40 and the auxiliary protrusions 39 and 41. And concaves 38b, 40b, 39b, and 41b are formed in the back face of the sealing plate 20 at the place corresponding to the anti-rotation protrusions 38 and 40 and the auxiliary protrusions 39 and 41. By forming concaves 38a, 40a, 39a and 41a, concaves 38b, 40b, 39b and 41b, the anti-rotation protrusions 38 and 40 and the auxiliary protrusions 39 and 41 are easy to be formed such that each of them has a height larger than that of the front face of the sealing plate 20. A convex portion 36 is formed on the back face of the sealing plate 20 corresponding to the concaved flat face 32 formed position.

The formation of the convex portion 36 on the back face of the sealing plate 20 corresponding to the concave portion 32 formed position as above increases the flexural strength of the sealing plate 20 in both the longitudinal direction and the width direction, compared with the case without the convex portion 36. Therefore, a prismatic nonaqueous electrolyte secondary battery 10 produced using the sealing plate 20 suppresses the deformation of the sealing plate 20 when the internal pressure is increased, thus the working pressure of the gas release valve 25 is stabilized. Moreover, if the gas release valve 25 is located at the center between the mouth 34 for attaching the positive electrode terminal 15 and the mouth 35 for attaching the negative electrode terminal 17, the internal pressure is equally applied to the gas release valve 25, and this can stabilize the working pressure of the gas release valve 25.

In the sealing plate 20 of the embodiment, a two-dimensional code as a first identification code 33 is formed on the flat face as the bottom of the concaved flat face 32 on the front face by, for example, laser marking, while, a second identification code 37 is similarly formed by laser marking on a surface of a side adjacent to the convex portion 36 on the back face.

The first identification code 33 is formed on the concaved flat face having a height less than that of the peripheral portions that are formed on the front face of the sealing plate 20. Thus, even when a jig for assembling the prismatic nonaqueous electrolyte secondary battery 10 or the like comes into contact with the sealing plate 20, such a jig is unlikely to physically come into contact with the first identification code 33. Therefore, the first identification code 33 is unlikely to be abraded, and the traceability is unlikely to be lost during the assembly process and after the assembly of the prismatic nonaqueous electrolyte secondary battery 10. The second identification code 37 is not exposed to the outside after the assembly of the prismatic nonaqueous electrolyte secondary battery 10, but is used for tracing during an assembly process of the prismatic nonaqueous electrolyte secondary battery 10. The first identification code 33 may be the same as or different from the second identification code 37.

Here, the laser marking is exemplified for explaining the application of the first identification code 33 and the second identification code 37, but well-known printing or seal-affixing may be adopted. However, the laser marking is preferably adopted because an applied code is unlikely to be abraded or peeled and is unlikely to be misread. Examples of the usable type of the identification code includes, in addition to the QR code, a simple code such as numbers, characters, and symbols, a one-dimensional code such as a bar-code, and a two-dimensional code such as a stacked bar-code. Among them, the QR code is desirable because it can contain a large amount of information and is misread less frequently even when the code has been abraded or peeled away. In addition, the first identification code 33 is formed on the side opposite to the electrolyte pour hole 23 through the gas release valve 25, and this increases the distance between the electrolyte pour hole 23 and the first identification code 33. As a result, even when an electrolyte is dispersed at the time when the electrolyte is poured from the electrolyte pour hole 23 into the prismatic hollow outer body 21, the electrolyte is unlikely to adhere to the first identification code 33, and hence the readability of the identification code is unlikely to be deteriorated by the electrolyte.

As the sealing plate 20 of the embodiment, the exemplified sealing plate has the convex portion 36 on the back face corresponding to the concaved flat face 32 that is formed on the front face, but the convex portion 36 is not a necessary component. For example, when the concaved flat face 32 is formed on the front face by cutting work, the convex portion is not formed. However, a sealing plate without such a convex portion does not have the advantage of abrasion resistance or peel resistance with respect to the identification code formed on the back face as well as having a smaller flexural strength in the longitudinal direction of the sealing plate 20. To address this, the convex portion 36 is preferably formed on the back face corresponding to the concaved flat face 32 that is formed on the front face as in the case of the sealing plate of the embodiment.

The embodiment describes the prismatic nonaqueous electrolyte secondary battery as an example of the prismatic secondary battery. However, the invention is also applicable to a prismatic secondary battery using an aqueous electrolyte, such as a nickel-hydrogen secondary battery.

The embodiment describes the prismatic nonaqueous electrolyte secondary battery as an example in which the positive electrode terminal and the negative electrode terminal are attached to the sealing plate in a manner electrically insulated from the sealing plate. Besides, the negative electrode terminal can be attached to the sealing plate in a manner electrically insulated and the positive electrode collector can be electrically connected to the prismatic hollow outer body or the sealing plate, thus the prismatic hollow outer body and the sealing plate can have a positive potential, for example. Alternatively, the prismatic hollow outer body and the sealing plate can have a negative potential.

What is claimed is:
1. A prismatic secondary battery comprising:
a prismatic hollow outer body having a mouth;
an electrode assembly including a positive electrode sheet and a negative electrode sheet;
a positive electrode collector electrically connected to the positive electrode sheet;
a negative electrode collector electrically connected to the negative electrode sheet;
a positive electrode terminal electrically connected to the positive electrode collector;
a negative electrode terminal electrically connected to the negative electrode collector; and
a sealing plate sealing the mouth of the prismatic hollow outer body, the sealing plate comprising:
a front face,
a back face,
a first mouth,
a second mouth,
a gas release valve formed between the first mouth and the second mouth, an electrolyte pour hole between the first mouth and the gas release valve, and an identification code formed between the second mouth and the gas release valve, wherein one of the positive electrode terminal and the negative electrode terminal is intercalated in the first mouth, wherein the other of the positive electrode terminal and the negative electrode terminal is intercalated in the second mouth, and wherein a nearest distance between the identification code and the gas release valve is less than a nearest distance between the identification code and the second mouth.

2. The prismatic secondary battery according to claim 1, wherein the positive electrode terminal is intercalated in the first mouth, wherein the negative electrode terminal is intercalated in the second mouth.

3. The prismatic secondary battery according to claim 1, wherein the sealing plate further comprises a concave formed between the identification code and the second mouth, and a protrusion formed on a bottom of the concave.

\* \* \* \* \*